Nov. 22, 1927.
A. J. HARPSTRITE
TIRE CUSHION
Filed May 18, 1927
1,650,271
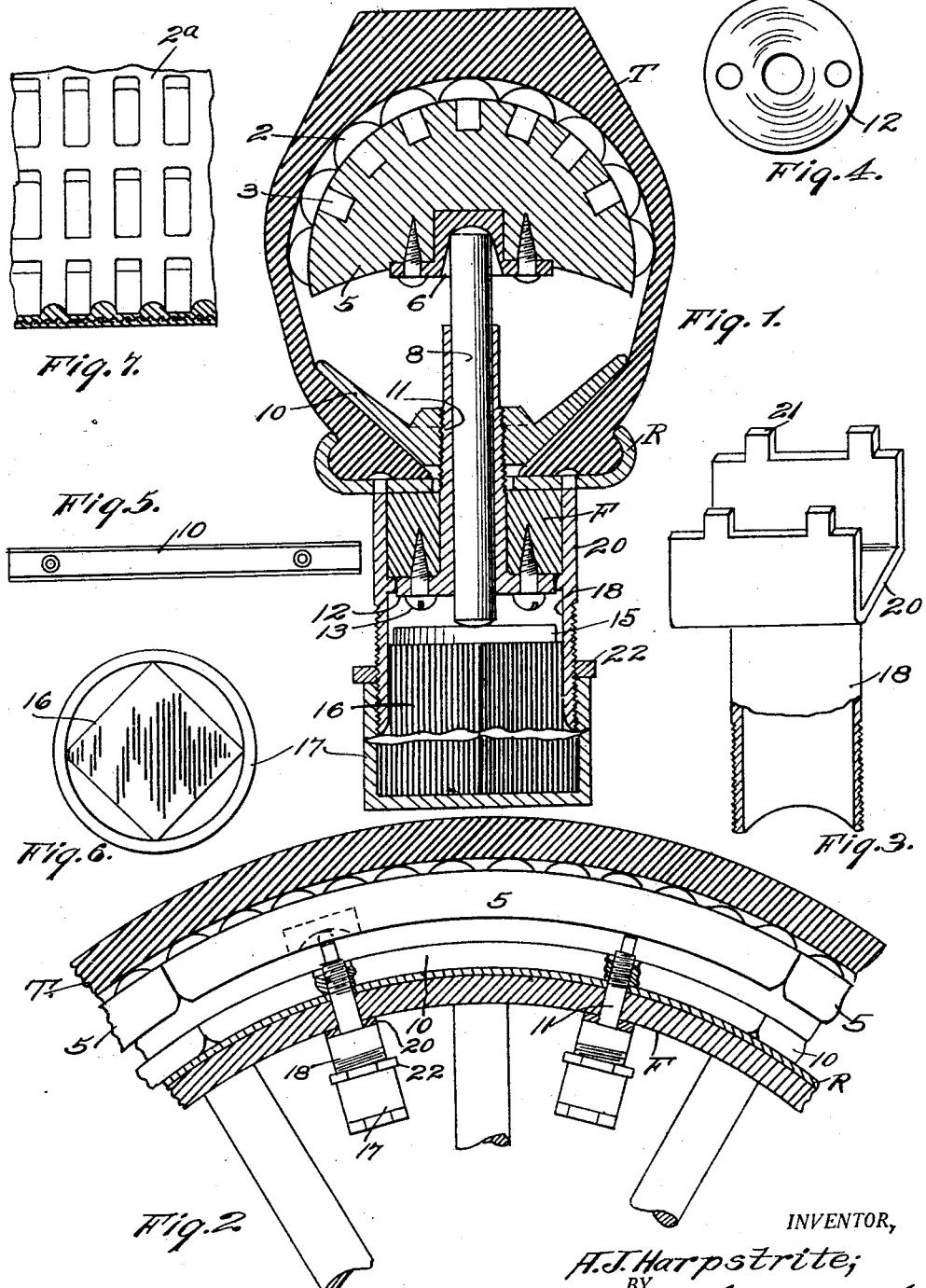
INVENTOR,
A. J. Harpstrite;
BY
G. E. Maynard,
ATTORNEY.

Patented Nov. 22, 1927.

1,650,271

UNITED STATES PATENT OFFICE.

AUGUSTUS J. HARPSTRITE, OF LOS ANGELES, CALIFORNIA.

TIRE CUSHION.

Application filed May 18, 1927. Serial No. 192,306.

This invention relates to cushioning means for rubber tires of vehicles and is an improvement upon the device of my application No. 117,754, filed June 22, 1926.

The object of the present invention is to reduce the number of parts of the tire sustaining means, reduce cost, increase the strength and durability of the parts and facilitate assembly.

Other objects, advantages and features will be made manifest in the following specification of the illustrated embodiment; it being understood that modifications, variations and adaptations may be resorted to within the spirit, scope and principle of the invention as it is more directly claimed hereinafter.

Figure 1 is a cross-section of a tire, rim, felly and the cushion means.

Figure 2 is a central, longitudinal section of a part of the rim assembly.

Figure 3 is a perspective of a rim clip and barrel.

Figure 4 is a bottom plan of a stem guide and clinch bolt.

Figure 5 is a top plan of a bead clincher (small scale).

Figure 6 is a plan of a cushion block and its shell.

Figure 7 is a perspective of a modified form of carcass pad.

The invention is adapted to a wheel including a felly F having a clincher ring or rim R receiving a tire carcass T of conventional type. An object is to eliminate the usual inner, inflatable tube and in its stead use a series of rubber blocks and means bearing thereon to cushion the tire.

In the carcass is a series of stout segments or backers 5, preferably of wood, making a complete circle and having rubber or asbestos composition knobs 2 bearing out against the tire. The knobs have stems 3 sunk in the face of their segments 5. Figure 7 illustrates a section of a continuous liner pad 2ª which may be used in lieu of the knobs.

Each backing segment has one or more sunken sockets 6 for the contiguous rounded end of a removable jack stem 8 which, after the assembly of the tire and segments on the felly, is passed in through the felly, and its rim R.

The backing segments are laid in the tire and a set of independent bowed clinching strips 10 is worked into place to hold down the rim beads. When the segments 5 and the strips 10 have been placed in the carcass it is placed on the rim. Threaded clamping bushings 11 are then passed through the rim and felly and screwed in the strips to draw these down hard upon the beads. The bushings have heads 12 held by screws 13 to the felly. The screw holes provide for engagement of a suitable key or wrench by which they may be screwed down tight on the strips 10 before the screws 13 are set.

The jack stems have snug working fit in the bushings and extend inward to bear on respective discs 15 which are supported on polygonal blocks 16, of rubber, which are enclosed in shells 17. Each shell has its outer end threaded and adjustable onto a barrel 18. The barrels are fixed on the inner faces of respective U-shaped clips 20 whose side arms embrace the felly and have outer lugs 21 to be riveted in the rim R at suitable points therealong. It will be seen that the blocks 16 can be compressed to a suitable degree by screwing in or out the shells 17. These are then locked by the nuts 22.

When in use the carcass is cushioned by the yielding action of the blocks under the compression strokes of the stems 8.

What is claimed is:

1. A tire carcass cushion comprising a circle of segmental tire backers each having sockets, jack stems seating on the sockets, bushings in which the stems slide radially, bead clinching strips screwed on the bushings to lie across a wheel rim and clamp the carcass beads in place thereon, rim clips secured to the wheel felly, and cushion means carried by the clips and receiving the inner ends of the jacks.

2. A tire carcass cushion device including a circle of segmental tire backers, a series of rim clips carrying barrels, shells adjustable on the barrels and enclosing rubber cushion blocks, jack stems engaging the backers and supported on said blocks, and bushings guiding the stems and mounted on the rim independently of the barrels.

3. In combination, a felly, a tire rim thereon, a carcass on the rim, and means to distend the carcass including a set of U-shaped clips each carrying a shell part and a barrel adjustable on the shell, a set of clinching bushings in the felly having threaded clinching strips on said bushings to be drawn down on the carcass beads, jack stems in the bushings, carcass supporting segments on the stems, and rubber cushions in the barrels for the stems.

AUGUSTUS J. HARPSTRITE.